United States Patent [19]

Watanabe et al.

[11] Patent Number: 5,737,134
[45] Date of Patent: Apr. 7, 1998

[54] REVOLVER CONTROL DEVICE

[75] Inventors: Akira Watanabe, Hanno; Shuji Nakagawa, Hamura, both of Japan

[73] Assignee: Olympus Optical Co., Ltd., Tokyo, Japan

[21] Appl. No.: 662,449

[22] Filed: Jun. 10, 1996

[30] Foreign Application Priority Data

Jun. 12, 1995 [JP] Japan ................. 7-144648
Jun. 12, 1995 [JP] Japan ................. 7-170260

[51] Int. Cl.$^6$ ............... G02B 7/16; G02B 21/00
[52] U.S. Cl. ........................... 359/821; 359/381
[58] Field of Search ................... 359/381, 368, 359/821

[56] References Cited

U.S. PATENT DOCUMENTS

| | | | |
|---|---|---|---|
| 4,544,236 | 10/1985 | Endo | 359/821 |
| 4,586,794 | 5/1986 | Bierleutgeb et al. | 359/381 |
| 4,653,878 | 3/1987 | Nakasato et al. | 359/381 |
| 4,961,636 | 10/1990 | Gaul | 359/381 |
| 5,260,825 | 11/1993 | Nagano et al. | 359/368 |
| 5,276,550 | 1/1994 | Kojima | 359/368 |

FOREIGN PATENT DOCUMENTS

| | | | |
|---|---|---|---|
| 242106A1 | 1/1987 | Germany | 359/821 |
| 60-118817 | 6/1985 | Japan | 359/821 |
| 3-213811 | 9/1991 | Japan . | |
| 4-20911 | 1/1992 | Japan . | |
| 2187905A | 9/1987 | United Kingdom | 359/821 |

*Primary Examiner*—Jon W. Henry
*Attorney, Agent, or Firm*—Frishauf, Holtz, Goodman, Langer & Chick

[57] ABSTRACT

A revolver control device of this invention includes a revolver rotatably formed and having a plurality of mounting holes which contain a specified mounting hole corresponding to a specified objective and in which a plurality of objectives containing the specified objective are respectively mounted, recognition circuit for recognizing at least one of one of the plurality of objectives and one of the plurality of mounting holes which lies on an observation optical axis, driving circuit for giving the rotation driving force to the revolver to move one of the plurality of objectives onto the observation optical axis, and control circuit for controlling the driving circuit to prevent the specified objective mounted on the revolver or the specified mounting hole from being passed through the observation optical axis by rotation of the revolver when at least one of the objective and mounting hole recognized by the recognition circuit is replaced by at least one of the plurality of objectives and mounting holes which is used as one of a target objective and a target hole.

11 Claims, 8 Drawing Sheets

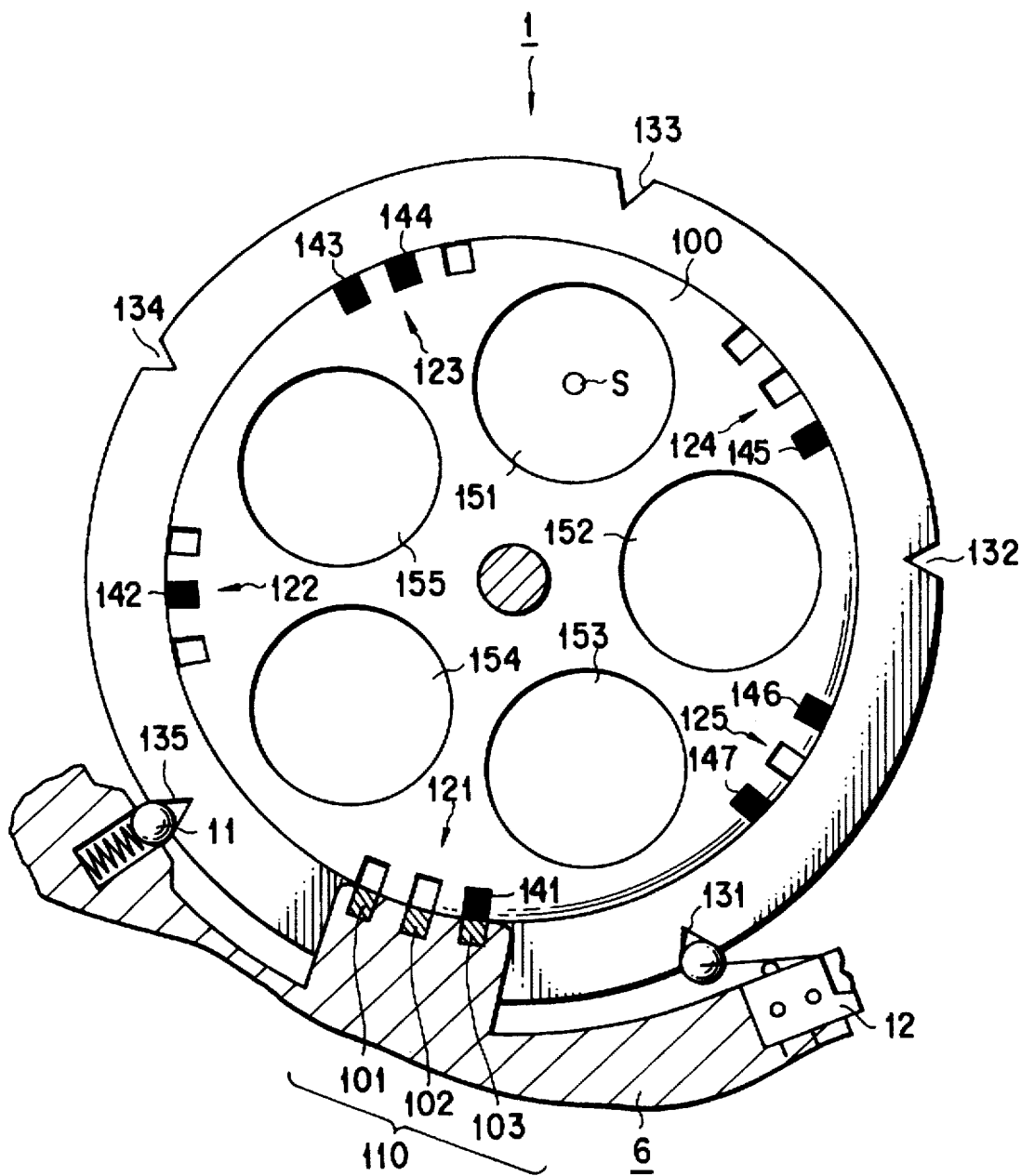
F I G. 2

| IDENTIFICATION NUMBER | MAGNIFICATION | WD |
|---|---|---|
| 1 | 5X | 15mm |
| 2 | 10X | 10mm |
| 3 | 20X | 5mm |
| 4 | 50X | 3mm |
| 5 | 100X | 1mm |

| MAGNIFICATION BEFORE SWITCHING (PRESENT MAGNIFICATION) | MAGNIFICATION AFTER SWITCHING (TARGET MAGNIFICATION) | SWITCHING ORDER |
|---|---|---|
| 5X | 10X | 5→10 |
|  | 20X | 5→10→20 |
|  | 50X | 5→10→20→50 |
|  | 100X | 5→10→20→50→100 |
| 10X | 20X | 10→20 |
|  | 50X | 10→20→50 |
|  | 100X | 10→20→50→100 |
|  | 5X | 10→5 |
| 20X | 50X | 20→50 |
|  | 100X | 20→50→100 |
|  | 5X | 20→10→5 |
|  | 10X | 20→10 |
| 50X | 100X | 50→100 |
|  | 5X | 50→20→10→5 |
|  | 10X | 50→20→10 |
|  | 20X | 50→20 |
| 100X | 5X | 100→50→20→10→5 |
|  | 10X | 100→50→20→10 |
|  | 20X | 100→50→20 |
|  | 50X | 100→50 |

5,737,134

REVOLVER CONTROL DEVICE

BACKGROUND OF THE INVENTION

1. Field of the Invention

This invention relates to a revolver control device which can be applied to a microscope or the like and can selectively set a plurality of objectives.

2. Description of the Related Art

Recently, the rotation of a revolver mounted on a microscope is electrically controlled by a motor or the like in many cases in order to enhance the operation speed and prevent the falling of dust on or near a sample (specimen) which may occur at the time of manual operation. This type of conventional revolver is disclosed in Jpn. Pat. Appln. KOKAI Publication No. 3-213811. In the above publication, the position control of the revolver and the construction of switches for designating the objective are disclosed.

The revolver disclosed in the above publication is advantageous in respect to enhancement of the operation speed and prevention of the falling of dust, but since it is electrically controlled and rotated at high speed, an unexpected accident tends to occur. That is, the distance between the revolver mounting plane of objective and the focal plane is generally set to be constant for each of the objectives, but a small difference or so-called parfocal error occurs in the actual position of the focal plane for each objective. Further, when an objective having a low magnification and large depth of focus is used, the distance between the objective and the sample may be set within a range of the depth of focus in a case where the operator recognizes the focused condition, but in practice, it may become shorter than the real value (distance) in some cases. That is, because of the large depth of focus, the objective is set excessively close to the sample in some cases. Further, since some samples do not have flat surfaces but have stepped surfaces, the objective may be set excessively close to the sample in some cases.

In this condition, if the operation of switching from an objective now used for observation, that is, an objective now set on the observation optical axis to an objective whose working distance is shorter than the former objective, that is, an objective which has a higher magnification is effected, a problem occurs. That is, since an objective of high magnification is generally longer than an objective of low magnification in the total length, the objective of high magnification may collide with the sample and one or both of them may be damaged when the operation of switching from the objective of low magnification set on the observation optical axis to the objective of high magnification is effected. The problem is inherent to the electric revolver. In the case of a manually operated revolver, since the operator will manually rotate the revolver while confirming that the objective will not collide with the sample, damage of the objective and sample can be prevented.

In the objective used in the recent microscope, the working distance WD (which is a distance from a top end of the objective to the focal plane) is short. Particularly, in a case where five or six objectives of low magnification to high magnification are mounted on the revolver, the working distance of the objective of high magnification is set equal to or less than 1/10 (1 mm) times the working distance of the objective of low magnification. Further, since the depth of focus becomes larger as the magnification becomes lower, there occurs a strong possibility that the deviation in the focusing position becomes large when the objectives of high and low magnifications are used. The above problem becomes serious when the microscope is used for checking large-scale semiconductor devices or the like.

In the case of above checking, mainly, the two types of objectives of low and high magnifications are alternately used. For example, when five objectives of magnifications of 5× (5× magnification), 10× (10× magnification), 20× (20× magnification), 50× (50× magnification) and 100× (100× magnification) are mounted on the revolver, the objectives of 5× and 50× are mainly used. When the above two objectives are used, the operator first observes the sample by use of the objective of 5×. Then, the operator operates the revolver position setting switch to rotate the revolver so that the objective to be used is sequentially switched from the objective of 5× to the objectives of 10×, 20×. The operator temporarily observes the sample by use of the objectives of 10×, 20× and then sets the objective of 50×. Alternatively, the operator passes the objectives of 10× and 20× disposed between the objectives of 5× and 50× without setting them on the observation optical axis and directly switches from the objective of 5× to the objective of 50× by rotating the revolver.

In this case, for example, the working distance of the objective of 100× is as short as 1 mm in many cases and it is used only for the checking operation requiring particularly precise observation. Further, when the objective of 100× is used, in general, the objective of 50× is first used and the adjustment is made for precise focusing, and then the objective of 50× is replaced by the objective of 100×. Therefore, the deviation in the focusing position can be suppressed to a small value and the possibility that the objective will collide with the sample becomes weak.

As described above, the operator generally checks the sample by using the objective of magnification between 5× and 50× which permits the safe switching between the objectives. In this case, the switching between the objectives of magnifications between 5× and 50× is generally effected by taking it into consideration that the objective of 100× will not pass over the sample.

However, the objective of 100× may pass over the sample in some cases against the operator's will when an unwanted revolver position setting switch is erroneously depressed by the blind operation by the operator and the revolver is controlled accordingly. Therefore, the operator must always note if the objective will collide with the sample or if the objective has collided with the sample for each operation.

In order to solve the above problems, the following measures are now taken.

1) A method of using an objective having a long working distance:

Objectives designed to have long working distances are lined up and the working distance of several mm is attained even when an objective of high magnification is used. However, in this case, the resolution is low and the cost of the objective itself is high.

2) A method taking an emergency avoidance into consideration (disclosed in Jpn. Pat. Appln. KOKAI Publication No. 4-20911):

When the objective is going to collide with the sample, the operator operates a preset emergency avoidance switch and the revolver is returned to the original position. In this case, if the timing of the switch operation is delayed, the reverse rotation of the revolver cannot be started in time for avoidance of the collision. That is, if the emergency avoidance switch is operated after the objective has collided with the sample, the objective will collide with the sample again when the revolver is rotated in the reverse direction.

SUMMARY OF THE INVENTION

An object of this invention is to provide a revolver control device capable of preventing collision of the objective with a sample.

A revolver control device of this invention comprises a revolver rotatably formed and having a plurality of mounting holes which contain a specified mounting hole corresponding to a specified objective and in which a plurality of objectives containing the specified objective are respectively mounted; a recognition circuit for recognizing at least one of one of the plurality of objectives and one of the plurality of mounting holes which lies on an observation optical axis; a driving circuit for giving the rotation driving force to the revolver to move one of the plurality of objectives onto the observation optical axis; and a control circuit for controlling the driving circuit to prevent the specified objective mounted on the revolver or the specified mounting hole from being passed through the observation optical axis by rotation of the revolver when at least one of the objective and mounting hole recognized by the recognition circuit is replaced by at least one of the plurality of objectives and mounting holes which is used as one of a target objective and a target hole.

A revolver control device of this invention comprises a revolver rotatably formed and having a plurality of mounting holes which contain a specified mounting hole corresponding to a specified objective and in which a plurality of objectives containing the specified objective are respectively mounted; a recognition circuit for recognizing at least one of one of the plurality of objectives and one of the plurality of mounting holes which lies on an observation optical axis; a driving circuit for giving the rotation driving force to the revolver to move one of the plurality of objectives or mounting holes which is adjacent to the objective or mounting hole set on the observation, optical axis onto the observation optical axis; and a control circuit for controlling the driving circuit to prevent rotation of the revolver in a preset direction when at least one of the objective and mounting hole recognized by the recognition circuit is at least one of the specified objective mounted on the revolver and the specified mounting hole.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a view showing the structure of the revolver according to the first to third and fifth embodiments of this invention;

DETAILED DESCRIPTION OF THE PREFERRED EMBODIMENTS

Figure 1:
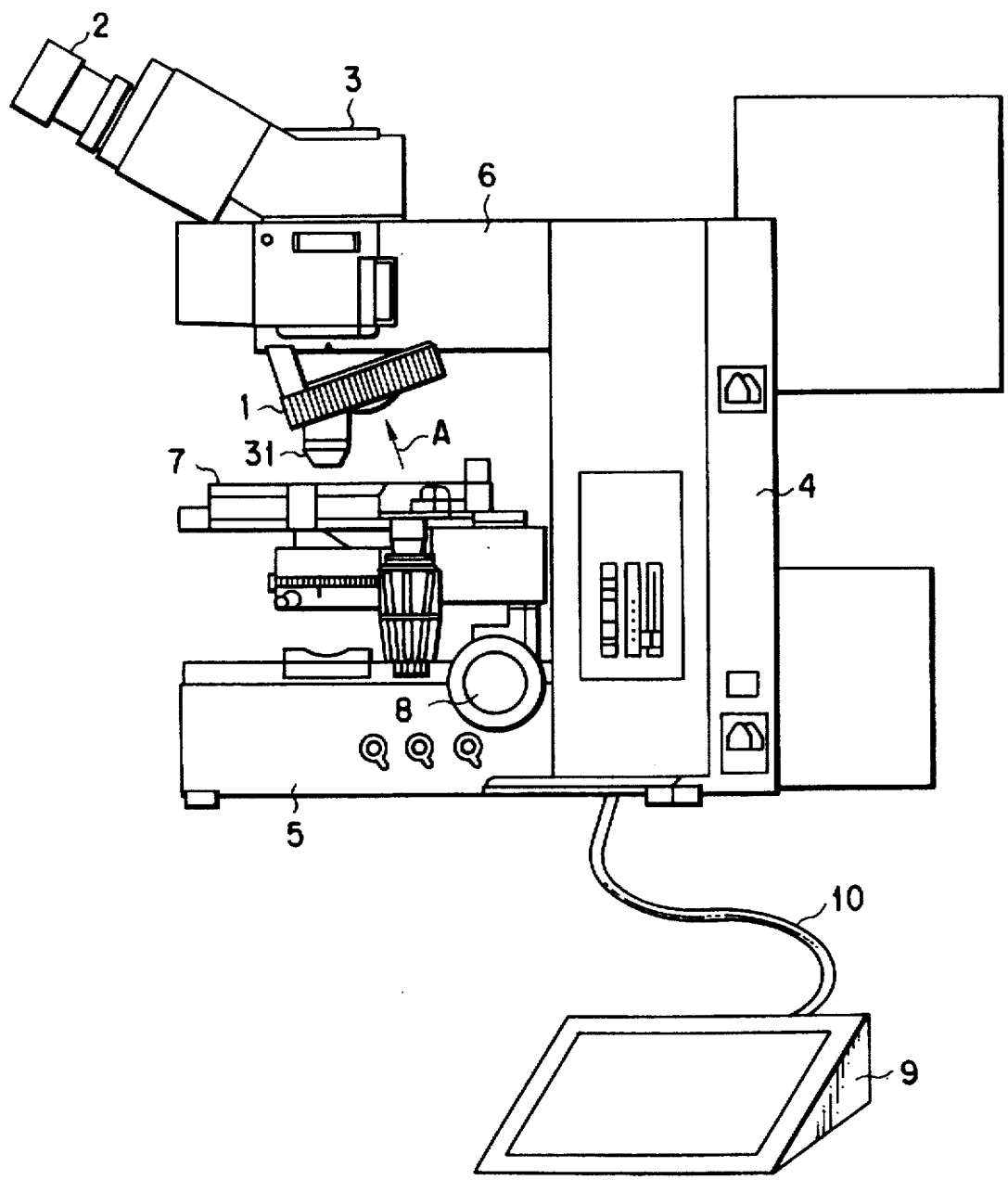
FIG. 1 is a side view showing the structure of a microscope to which a revolver control device according to first to fifth embodiments of this invention is applied.

FIG. 1 is a side view showing the structure of a microscope to which a revolver control device according to a first embodiment of this invention is applied. In the microscope, a revolver 1 is arranged below a tube 3 having an eyepiece 2 mounted thereon. The microscope has a base 5 constructing a lower portion of a microscope frame 4 and the base 5 projects forwardly from the microscope frame 4. An illuminating system is contained in the base 5.

An arm 6 which forwardly projects like the base 5 is formed on the upper portion of the microscope frame 4. The tube 3 containing a prism (not shown) is mounted on the arm 6. The revolver 1 having a mounting body capable of mounting a plurality of objectives (31) as will be described later is removably mounted on the undersurface of the tube 3. The revolver 1 can set one of the objectives on the observation optical axis by rotating the mounting body.

Further, a stage 7 is disposed in a space between the base 5 and the objective 31 and the stage 7 is connected to a focusing mechanism mounted on the microscope frame 4. The stage 7 can be vertically moved by operating a focusing handle 8 of the focusing mechanism and can be horizontally moved by operating a stage handle of the focusing mechanism. Further, a through hole is formed in the stage 7 along the observation optical axis. An input/output section 9 including various switches is connected to the main body of the microscope via a cable 10.

FIG. 2 is a view showing the structure of the revolver 1 as viewed from the direction indicated by an arrow A in FIG. 1. A sensor 110, an engagement ball 11 elastically held and a microswitch 12 are provided on a portion of the revolver 1 which lies on the main body side of the microscope. Further, V-grooves 131 to 135 and magnetic codes 121 to 125 each constructing a binary code are provided in preset positions 151 to 155 are mounting holes for mounting objectives.

The magnetic codes 121 to 125 are provided in positions corresponding to the mounting holes 151 to 155 to identify the mounting hole (151 in FIG. 2) which is set on the observation optical axis S and are each constructed by three identifying elements. In each of the magnetic codes 121 to 125, one or two of the three identifying elements are constructed by a magnetic material to provide an inherent binary code. The sensor 110 is constructed by three magnetic sensors 101, 102, 103 which correspond to the three identifying elements of the magnetic code. By causing each of the magnetic sensors 101 to 103 to detect that the corresponding identifying element is a magnetic material or not, the sensor 110 can read the binary code constructed by the magnetic code. The binary code is used as an identification number, and the sensor 110 can identify the mounting hole placed on the observation optical axis S.

Figure 3:
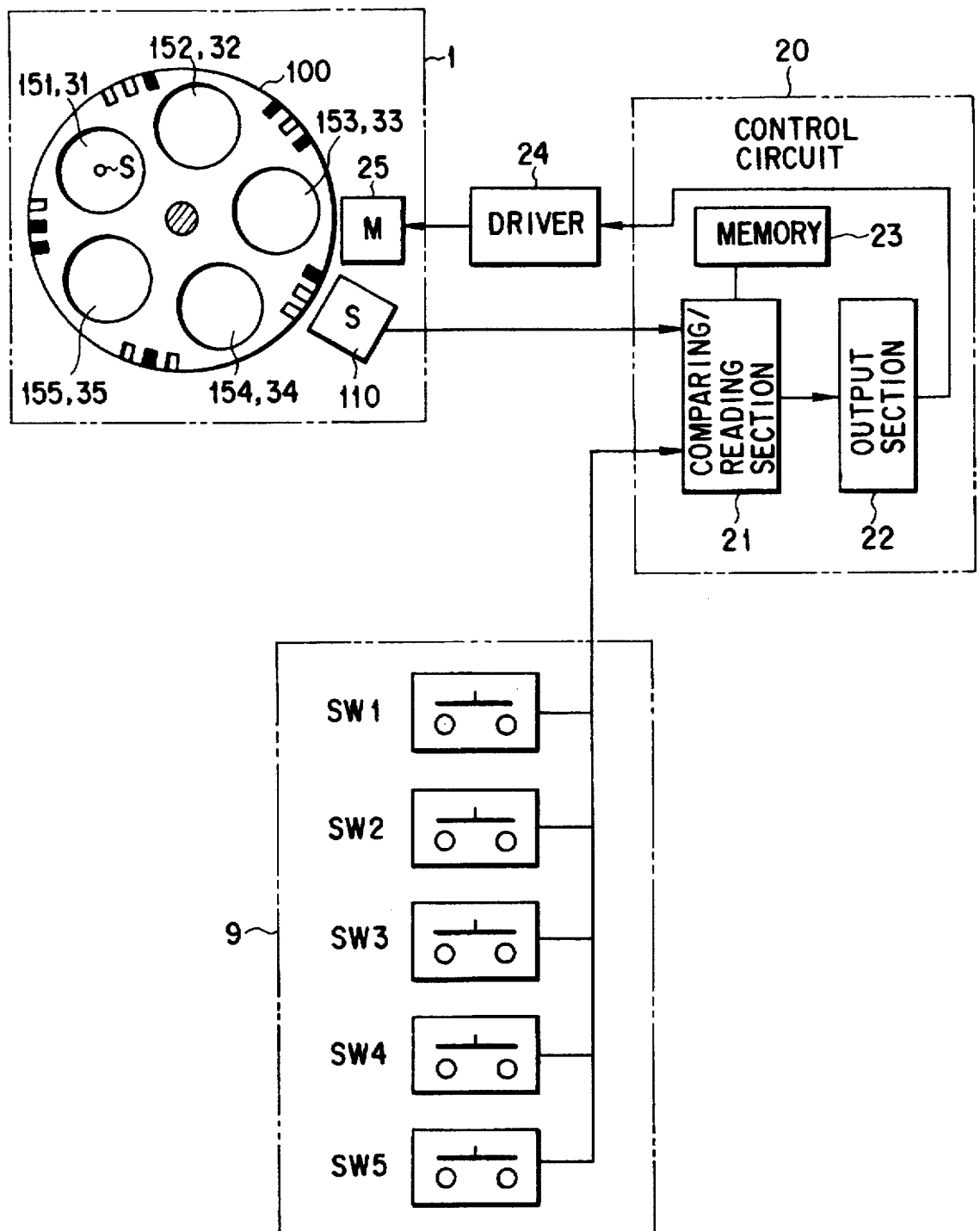
FIG. 3 is a diagram showing the construction of the revolver control device according to the first to third and fifth embodiments of this invention.

FIG. 3 is a diagram showing the construction of a revolver control device according to the first embodiment. In FIG. 3, portions which are the same as those of FIGS. 1 and 2 are denoted by the same reference numerals. The revolver 1 has a disk-like mounting body 100 which is rotatably held. In the mounting body 100, the mounting holes 151 to 155 for objectives are formed as described before. In the respective mounting holes 151 to 155, objectives 31 to 35 of magnifications of 5× (5× magnification), 10× (10× magnification), 20× (20× magnification), 50× (50× magnification) and 100× (100× magnification) are mounted. Thus, the five objectives 31 to 35 are arranged in a circular form on the revolver 1 in an order based on the magnitudes of the magnifications thereof. Information representing that objectives 31 to 35 are mounted in the respective mounting holes 151 to 155 is stored in a memory 23.

A control circuit 20 has a comparing/reading section 21, output section 22 and the memory 23. The comparing/reading section 21 is connected to the output section 22 and memory 23. Further, a rotating motor 25 is connected to the output section 22 via a driver 24 and the comparing/reading section 21 is connected to the magnetic sensor 110 and five revolver switches SW1 to SW5 provided in the input/output section 9.

Figures 4, 5, 6:
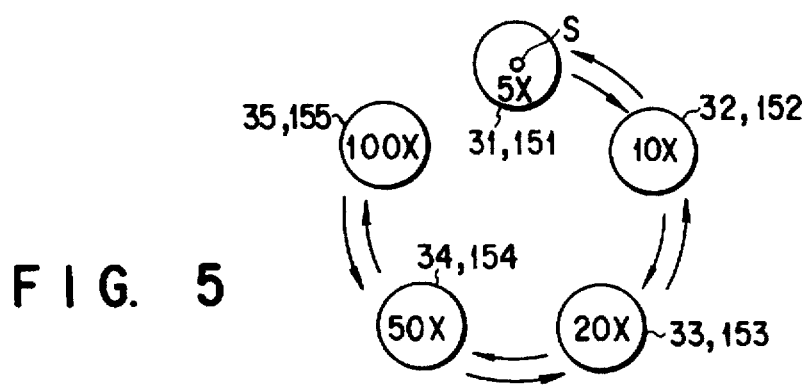
FIG. 4 is a diagram showing the relation between the "identification numbers", "magnifications", and "working distances WD" stored in memory according to the first embodiment of this invention.
FIG. 5 is a diagram indicating the direction in which the objective is moved by rotation of the mounting body of the revolver according to the first embodiment of this invention.
FIG. 6 is a diagram showing the relation between the magnification (the present magnification) of the objective set on the observation optical axis before the mounting body of the revolver according to the first embodiment of this invention is rotated and the magnification (the target magnification) of the objective set on the observation optical axis after the mounting body of the revolver is rotated.

FIG. 4 is a diagram showing the relation between the "identification numbers", "magnifications", and "working distances WD". The "identification numbers" indicate inherent numbers represented by the binary codes set for the respective mounting holes 151 to 155 and are used to identify the mounting holes 151 to 155. The "magnifications" indicate the magnifications of the objectives 31 to 35 mounted in the respective mounting holes 151 to 155 corresponding to the identification numbers. The "working distances WD" indicate the working distances of the objectives 31 to 35 mounted in the respective mounting holes 151 to 155 corresponding to the identification numbers.

The revolver switches (objective selecting switches) SW1 to SW5 are selectively operated by the operator to select an objective to be used for observation (which is hereinafter referred to as a target objective), i.e. an objective required to be set on the observation optical axis S and set the selected objective on the observation optical axis S. The revolver switches SW1 to SW5 are provided for the respective objectives 31 to 35, and the objectives 31 to 35 (mounting holes 151 to 155) are moved along a path to be described later and set on the observation optical axis S when the switches SW1 to SW5 are depressed, respectively. The comparing/reading section 21 recognizes the identification number of a mounting hole to be moved onto the observation optical axis S when one of the switches SW1 to SW5 is depressed. That is, the comparing/reading section 21 determines that the mounting hole 151, 152, 153, 154 or 155 should be moved onto the observation optical axis S when the depressed switch is SW1, SW2, SW3, SW4 or SW5, respectively. The revolver switches SW1 to SW5 are set to the ON state when depressed and are then immediately returned to the OFF state.

As described above, the sensor 110 has a function of identifying the mounting holes 151 to 155 formed in the mounting body 100 and positioned on the observation optical axis and detects the array pattern of the magnetic members of the magnetic codes 121 to 125 arranged on the outer peripheral surface of the mounting body 100. The magnetic sensors 101 to 103 of the sensor 110 read a pattern constructed by the three identifying elements of each of the magnetic codes 121 to 125. Further, the sensor 110 identifies the mounting hole set on the observation optical axis S based on the result of reading and outputs a signal indicating the identification number represented by the magnetic code corresponding to the identified mounting hole to the comparing/reading section 21.

The comparing/reading section 21 reads out a magnification corresponding to the target objective mounted in the selected mounting hole from the memory 23 when one of the revolver switches SW1 to SW5 is depressed. Further, when a signal indicating the identification number corresponding to the mounting hole set on the observation optical axis S is input from the sensor 110, the comparing/reading section 21 reads out a magnification of the present objective corresponding to the identification number indicated by the signal from the memory 23. Next, the comparing/reading section 21 determines whether the magnification of the present objective corresponding to the present mounting hole and read out from the memory 23 is higher or lower than the magnification of the target objective selected by the revolver switches SW1 to SW5 and outputs the result of determination to the output section 22. Further, if the magnification of the present objective is the same as the magnification of the target objective, the comparing/reading section 21 does not output the result of determination.

The output section 22 outputs a rotating direction specifying instruction to the driver 24 based on the input from the comparing/reading section 21. The output section 22 outputs an instruction for rotating the motor 25 in the lower-magnification direction as the rotating direction specifying instruction to the driver 24 when the magnification of the present objective set on the observation optical axis S is higher than the magnification of the target objective. Further, the output section 22 outputs an instruction for rotating the motor 25 in the higher-magnification direction as the rotating direction specifying instruction to the driver 24 when the magnification of the present objective is lower than the magnification of the target objective. The driver 24 outputs an instruction for driving in a corresponding rotating direction to the motor 25 according to the rotating direction specifying instruction input from the output section 22. The motor 25 rotates the mounting body 100 in a lower-magnification direction or higher-magnification direction according to the driving instruction input from the driver 24.

FIG. 5 is a diagram indicating the direction in which the objective is moved by rotation of the mounting body 100 of the revolver 1. The objectives 31 to 35 are generally arranged in a circular configuration in an order of 5×, 10×, 20×, 50× and 100× from the low magnification to the high magnification (from the high magnification to the low magnification) as shown in FIG. 5. As shown in FIG. 4, the working distances WD of the objectives become smaller and are set to 15 mm, 10 mm, 5 mm, 3 mm and 1 mm as the magnifications thereof become higher. Further, since the depth of focus becomes larger as the magnification becomes lower, there occurs a possibility that a difference in the focusing position between the low-magnification objective and the high-magnification objective becomes larger.

FIG. 6 shows the relation between the magnification (the present magnification) of the objective set on the observation optical axis S before the mounting body 100 of the revolver 1 is rotated and the magnification (the target magnification) of the objective set on the observation optical axis S after the mounting body 100 of the revolver 1 is rotated and shows the order in which the objectives pass the observation optical axis S when the operation of switching from the objective now set on the observation optical axis S to the target objective.

For example, in a case where the magnification of the present objective is 5× and the magnification of the target objective is 50×, the objective to be brought on the observation optical axis S is sequentially switched in the order of 5×→10×→20×43 50×. Further, in a case where the magnification of the present objective is 50× and the magnification of the target objective is 5×, the objective to be brought on the observation optical axis S is sequentially switched in the order of 50×→20×→10×→5×. That is, even if any combination of the present magnification and the target magnification is selected, the switching from 5× directly to 100× or the switching from 100× directly to 5× will not occur.

In the above-described explanation, for example, in a case where the magnification of the present objective is 5× and the magnification of the target objective is 50×, the objectives which are sequentially brought on the observation optical axis S are switched in the order of 5×→10×→20×→50×. In this case, if the objectives are switched in the order of 5×→100×→50× so as to set the target objective by way of the shortest route as in the conventional revolver device, the working distance WD is changed in the order of 15 mm→1 mm→3 mm. In this case, since the working distance becomes significantly shorter when the objective of 100× passes the observation optical axis S than when the objective of 5× is set on the optical axis, there occurs a strong possibility that the objective of 100× will be brought into contact with the sample. That is, when the large depth of focus of the present objective of 5× and the parfocal error of each objective are taken into consideration, the above possibility becomes stronger in the case of the working distance WD of approx. 1 mm.

Further, since each of the objectives is revolved along a circular path by rotation of the mounting body 100 of the revolver 1, the locus of the edge portion of the objective frame at the time of switching projects downwardly with respect to the locus of the front end portion of the objective. Therefore, the substantial gap between the objective and the sample becomes shorter, thus enhancing the possibility of collision. However, according to the first embodiment, since the objective is moved only in a direction indicated in FIG. 5, there occurs no possibility that the objective will collide with the sample.

Figure 7:
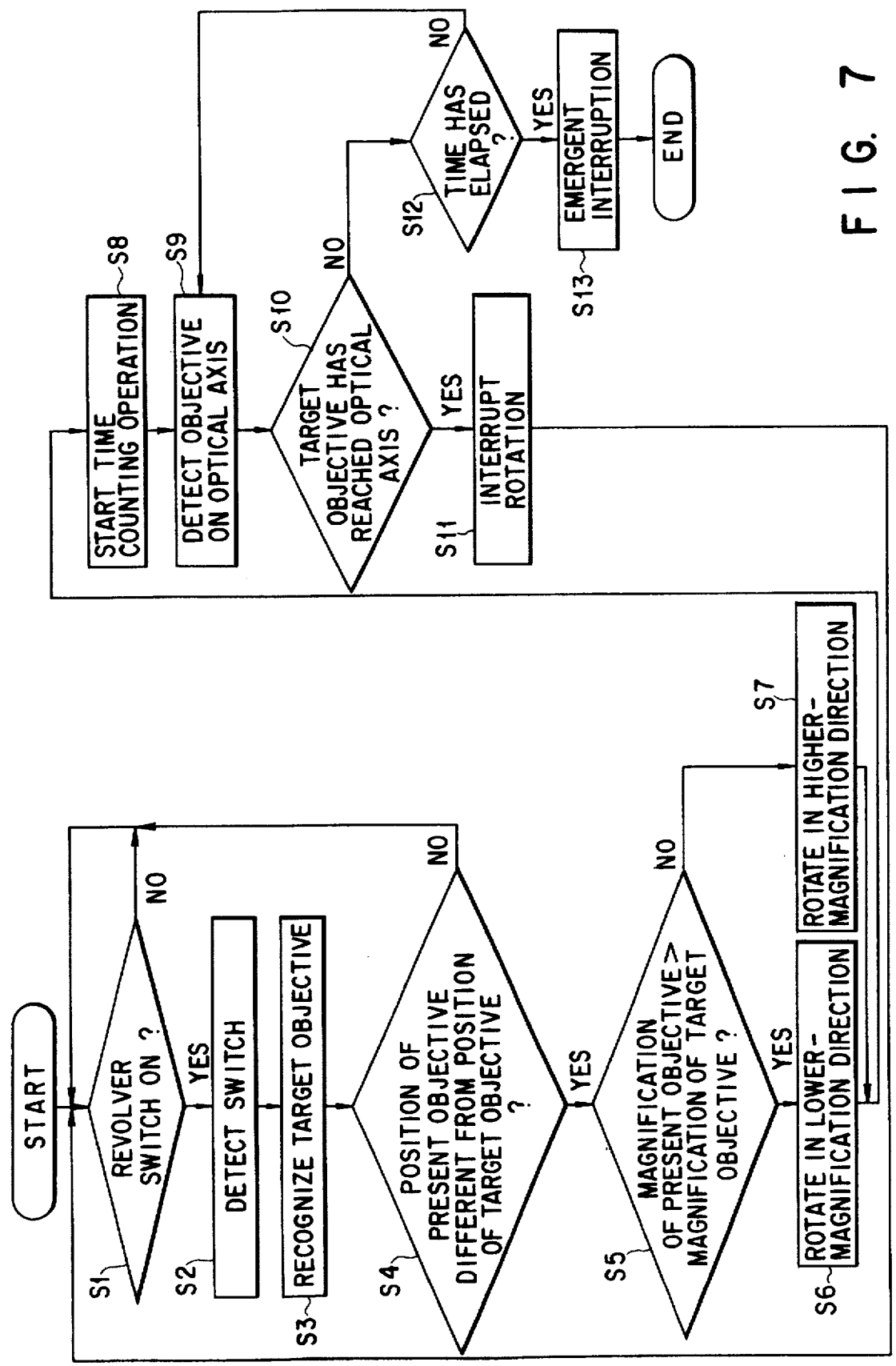
FIG. 7 is a flowchart for illustrating the operation procedure of the revolver device according to the first embodiment.

FIG. 7 is a flowchart for illustrating the operation procedure of the revolver control device according to the first embodiment. The operation procedure of the revolver control device is explained with reference to FIG. 7. First, if the comparing/reading section 21 detects in the step S1 that one of the switches SW1 to SW5 is depressed by the operator, it detects one of the switches SW1 to SW5 which is set in the ON state in the step S2. Then, the comparing/reading section 21 recognizes a target objective, that is, an objective which the operator wants to set on the observation optical axis S in the step S3.

Then, it is determined in the step S4 whether the position of the objective (present objective) which is now set on the observation optical axis S and the position of the objective (target objective) which is desired to be next set on the observation optical axis S are different from each other or not. At this time, the comparing/reading section 21 recognizes the present objective based on a signal input from the sensor 110 and indicating an identification number of the mounting hole lying on the observation optical axis S and determines whether the recognized objective is different from the target objective or not.

In this case, if it is determined that the target objective is the same as the present objective, it is not necessary to rotate the mounting body 100 of the revolver 1 since the target objective and the present objective are already set in the same position. Therefore, the comparing/reading section 21 waits in the step S1 until one of the revolver switches SW1 to SW5 is depressed by the operator.

If it is determined in the step S4 that the target objective is different from the present objective, the comparing/reading section 21 determines one of the present objective and the target objective which has a higher magnification in the step S5. At this time, the comparing/reading section 21 reads out the magnification of an objective which corresponds to the identification number corresponding to a depressed one of the revolver switches SW1 to SW5 and the identification number of the present objective from the memory 23. Next, the comparing/reading section 21 reads out magnifications corresponding to the two identification numbers from the memory 23 and determines a higher one of the magnifications. The comparing/reading section 21 outputs the result of determination to the output section 22.

If it is determined in the step S5 that the magnification of the present objective is higher than that of the target objective, the output section 22 outputs an instruction for rotating the motor 25 in the lower-magnification direction as the rotating direction specifying instruction to the driver 24 in the step S6. The driver 24 outputs an instruction for driving in the lower-magnification direction, i.e. in the counterclockwise direction shown in FIG. 5 to the motor 25 according to the rotating direction specifying instruction input from the output section 22. The motor 25 rotates the mounting body 100 in the lower-magnification direction according to the driving instruction input from the driver 24.

Further, if it is determined in the step S5 that the magnification of the present objective is lower than that of the target objective, the output section 22 outputs an instruction for rotating the motor 25 in the higher-magnification direction as the rotating direction specifying instruction to the driver 24 in the step S7. The driver 24 outputs an instruction for driving in the higher-magnification direction, i.e. in the clockwise direction shown in FIG. 5 to the motor 25 according to the rotating direction specifying instruction input from the output section 22. The motor 25 rotates the mounting body 100 in the higher-magnification direction according to the driving instruction input from the driver 24.

At the same time as the rotation of the mounting body 100, the comparing/reading section 21 drives a timer (not shown) to start the time counting operation in the step S8 and detects a mounting hole or objective set on the observation optical axis S based on the binary code detected by the sensor 110 in the step S9. Next, in the step S10, the comparing/reading section 21 determines whether or not the target objective has reached the observation optical axis S. If the comparing/reading section 21 detects that the target objective has reached the observation optical axis S, it outputs an interrupting instruction to the motor 25 via the output section 22 and driver 24 in the step S11. The motor 25 interrupts the rotation of the mounting body 100 according to the interrupting instruction.

If it is determined in the step S10 that the target objective has not reached the observation optical axis S, the comparing/reading section 21 determines in the step S12 whether time counted by the timer has exceeded a preset time or not. If the preset time has elapsed, the comparing/reading section 21 outputs an emergency interruption instruction to the motor 25 via the output section 22 and driver 24 in the step S13. The motor 25 urgently interrupts the rotation of the mounting body 100 according to the emergency interruption instruction. Further, if it is determined in the step S12 that the preset time has not elapsed, the comparing/reading section 21 successively effects the detecting operation in the step S9 until the target objective reaches the position on the observation optical axis.

The feature in the flowchart shown in FIG. 7 lies in the steps S4 to S7. That is, the comparing/reading section 21 determines whether the position of the present objective is different from that of the target objective (step S4), and if it is determined that they are different from each other, it determines whether the magnification of the present objective is higher than that of the target objective or not (step S5). If the magnification of the target objective is higher than that of the present objective, the comparing/reading section 21 outputs the instruction for rotation in the higher-magnification direction to the motor 25 so as to rotate the motor 25 (step S6). Further, if the magnification of the target objective is lower than that of the present objective, the comparing/reading section 21 outputs the instruction for rotation in the lower-magnification direction to the motor 25 so as to rotate the motor 25 (step S7). The feature of the flowchart of FIG. 7 lies as described above.

Thus, according to the first embodiment, for example, when the operation of switching from the present objective with a magnification of 5× to an objective with a magnification of 50× is effected, the objectives are sequentially switched in the order of 5×→10×→20×→50× as shown in FIG. 6. Therefore, the objectives can be switched without causing the objective with a magnification of 100× which is the highest magnification, i.e. the objective having the shortest working distance WD to pass the observation optical axis S. Further, as described before, when the operation of switching to the objective of 100× is effected, the switching to the objective of 100× is generally effected after the focusing operation is effected at a magnification of 50×, but according to the first embodiment, after the switching from 5× to 50× is effected in the above-described order, the objective of 50× can be replaced by the objective of 100×. That is, the switching from 5× directly to 100× is not allowed. As a result, the deviation in the focusing position caused by the depth of focus and the parfocal error can be reduced and there occurs no possibility that the objective will collide with the sample.

The construction of a revolver control device according to a second embodiment of this invention is the same as that of the first embodiment shown in FIGS. 2 and 3. Further, the structure of a microscope to which the revolver control device is applied is the same as that shown in FIG. 1. Part of the operation of the revolver control device according to the second embodiment which is different from the operation of the first embodiment is explained.

Figure 8:
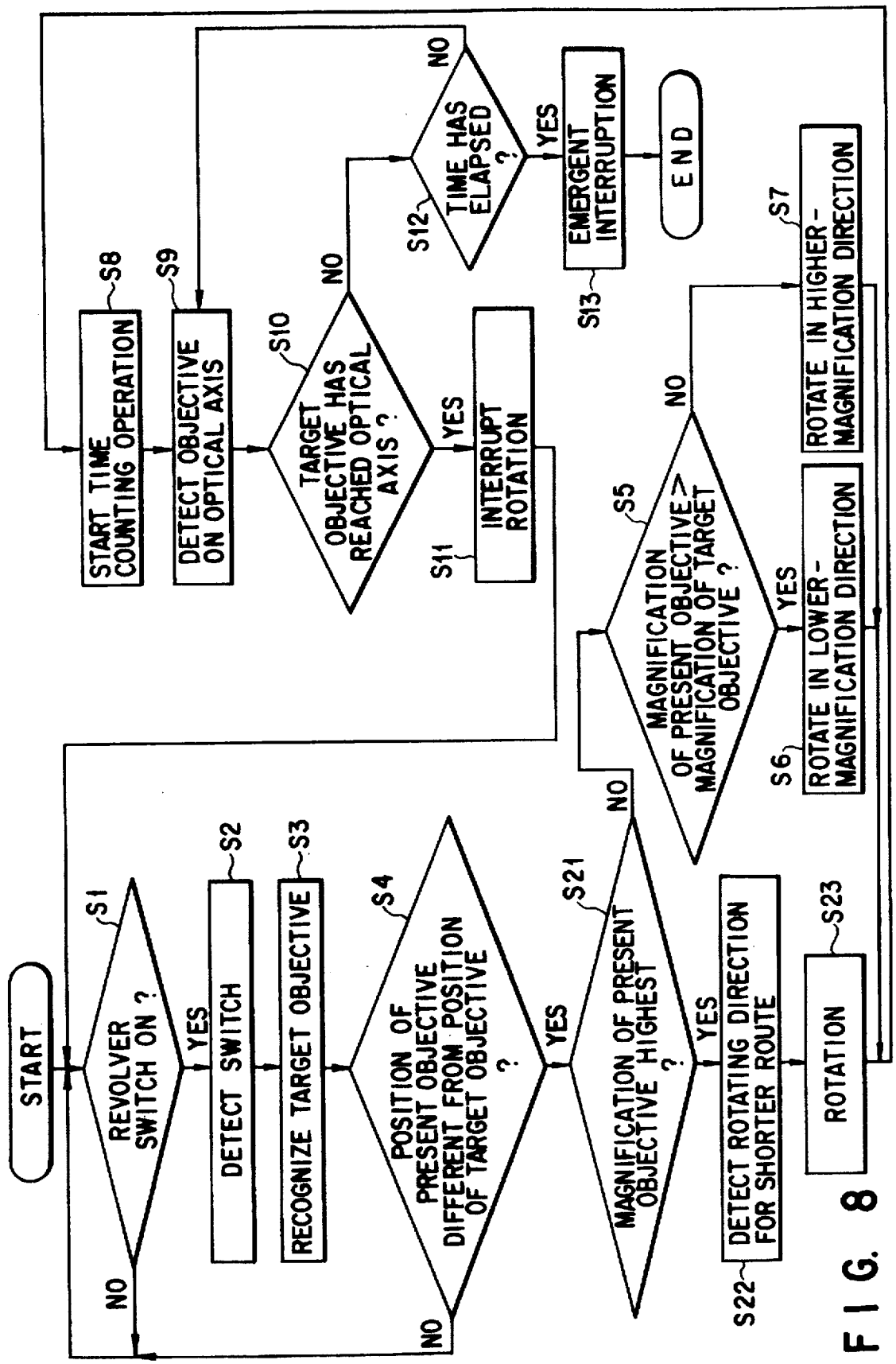
FIG. 8 is a flowchart for illustrating the operation procedure of the revolver device according to the second embodiment.

FIG. 8 is a flowchart for illustrating the operation procedure of the revolver device according to the second embodiment. The flowchart shown in FIG. 8 is different from the flowchart of the first embodiment shown in FIG. 7 in that steps S21, S22, S23 are newly added. In FIG. 8, the same steps as those shown in FIG. 7 are denoted by the same reference numerals.

The comparing/reading section 21 determines in the step S4 whether the position of the objective (present objective) which is now set on the observation optical axis S and the position of the objective (target objective) which is desired to be next set on the observation optical axis S are different from each other or not. At this time, if it is determined that the positions of the objectives are different from each other, the comparing/reading section 21 determines in the step S21 whether the magnification of the present objective is the highest magnification or not. That is, the comparing/reading section 21 reads out a magnification corresponding to the recognition number of the present objective from the memory 23 and determines whether or not the magnification is the highest one (100×) of the magnifications of the five objectives 31 to 35.

At this time, if the highest magnification is determined, the comparing/reading section 21 determines one of the two rotating directions (clockwise direction and counterclockwise direction) of the mounting body 100 which permits the switching from the present objective (100×) to the target objective to be attained by way of a shorter route in the step S22 and outputs the result of determination to the output section 22. Determination of the rotating direction for attaining the shorter route by the comparing/reading section 21 is made by comparing the numbers of objectives which will pass the observation optical axis S before the target objective is reached when the mounting body 100 is rotated in two rotating directions.

Next, in the step S23, the output section 22 outputs an instruction for rotating the motor 25 in the rotating direction for attaining the shorter route as the rotating direction specifying instruction to the driver 24. The driver 24 outputs an instruction for driving in the above rotating direction according to the rotating direction specifying instruction input from the output section 22 to the motor 25. The motor 25 rotates the mounting body 100 in the above rotating direction according to the driving instruction input from the driver 24. If it is determined in the step S21 that the magnification is not the highest magnification, the process including the step S5 and the succeeding steps in the first embodiment is effected.

In the second embodiment, switching of the objectives can be effected efficiently by adding the above steps S21, S22, S23. This is because the rotation control for selecting the rotating direction corresponding to the shorter switching route is effected when it is detected in the step S21 that the magnification of the present objective is the highest magnification (100×).

For example, in the first embodiment, if switching of the objectives from 100× to 5× is specified, the rotation control for selecting the counterclockwise direction (lower-magnification direction) is effected to effect the switching in the order of 100×→50×→20×→10×→5× as shown in FIG. 5. However, in the second embodiment, the rotation control for selecting the clockwise direction (higher-magnification direction) is effected to effect the switching from 100× directly to 5×. Likewise, in the first embodiment, if switching of the objectives from 100× to 10× is specified, the rotation control for selecting the counterclockwise direction (lower-magnification direction) is effected to effect the switching in the order of 100×→50×→20×→10×, but in the second embodiment, the rotation control for selecting the clockwise direction (higher-magnification direction) is effected to effect the switching of the objectives in the order of 100×→5×→10×.

The reason why the switching of the objectives from 5× directly to 100× is inhibited in the first embodiment is that there occurs a strong possibility that the objective of 100× will be brought into contact with the sample since the working distance becomes extremely shorter when the objective of 100× passes over the sample than when the objective of 5× passes. However, even if the objectives are switched from 100× directly to 5×, there occurs no possibility that the objective of 5× will be brought into contact with the sample since the working distance becomes extremely longer when the objective of 5× passes over the sample than when the objective of 100× passes.

Thus, according to the second embodiment, when the working distance of the objective is significantly increased, the switching from the objective of highest magnification directly to the objective of lowest magnification is permitted. Therefore, the switching of the objectives can be effected according to the rotation control for selecting one of the two rotating directions of the mounting body 100 which corresponds to a shorter one of the two routes from the present objective to the target objective and thus time for switching can be reduced.

A revolver control device according to a third embodiment of this invention has a mode selection switch provided in an input/output section 9 and operated to select one of the operation procedure shown in the flowchart of FIG. 7 in the first embodiment and the operation procedure shown in the flowchart of FIG. 8 in the second embodiment. Although not shown in the drawing, the mode selection switch is connected to the comparing/reading section 21 shown in FIG. 3. The other construction of the revolver control device is the same as that of the first embodiment shown in FIGS. 2 and 3.

In the revolver control device, a control section (not shown) of a control circuit 20 has an operation mode in which priority is given to protection of the objectives and sample as shown in the flowchart of FIG. 7 and an operation mode in which priority is given to switching time to reduce the time for switching of the objectives as shown in the flowchart of FIG. 8. The operator can select one of the above two operation modes by operating the mode selection switch. The control section effects the operation mode selected by the operator. The operator can selectively and adequately use the two operation modes according to the application.

Figure 9:
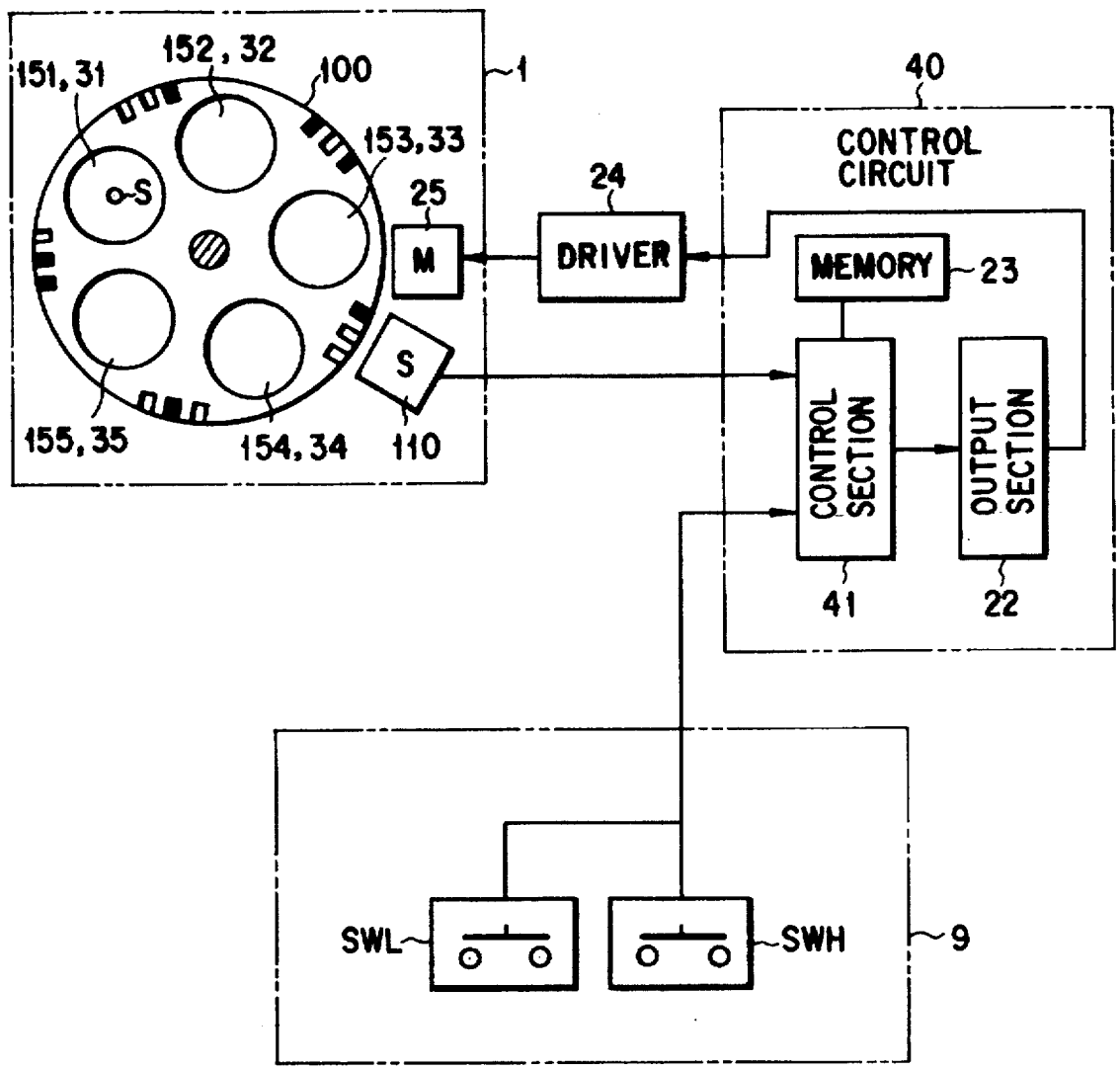
FIG. 9 is a diagram showing the construction of the revolver control device according to the fourth embodiment of this invention.

FIG. 9 is a diagram showing the construction of a revolver control device according to a fourth embodiment of this invention. In FIG. 9, portions which are the same as those shown in FIGS. 2 and 3 are denoted by the same reference numerals. Further, the structure of a microscope to which the revolver control device is applied is the same as that shown in FIG. 1. The first, second and third embodiments utilize a switching system in which the operator specifies the target objective to prevent the objective from being brought into contact with the sample when the working distance WD is extremely reduced. However, the fourth embodiment utilizes a switching system in which the operator specifies only the rotating direction.

A revolver 1 has a disk-like mounting body 100 rotatably mounted. On the mounting body 100, five objectives 31 to 35 having different magnifications are mounted and arranged in an order of the working distances or magnifications. A rotation motor 25 rotates the mounting body 100 in the clockwise direction or counterclockwise direction to move the objective which is now set on the observation optical axis S and sequentially move the objective adjacent to the former objective onto the observation optical axis S.

A control section 41 of a control circuit 40 gives a driving instruction to the motor 25 via an output section 22 and driver 24. A sensor 110 recognizes the objective which is now set on the observation optical axis S. Two revolver switches SWH, SWL are selectively depressed by the operator when a target objective is brought onto the observation optical axis S, and the mounting body 100 is rotated in the clockwise direction, i.e. in the higher-magnification direction when the revolver switch SWH is depressed, and the mounting body 100 is rotated in the counterclockwise direction, i.e. in the lower-magnification direction when the revolver switch SWL is depressed. That is, the mounting body 100 is rotated in the clockwise direction or counterclockwise direction when one of the revolver switches SWH and SWL is once depressed and the objective set on the observation optical axis S is switched from the present objective to an adjacent objective.

The control section 41 inhibits the rotation of the mounting body 100 if the magnification of the present objective recognized by the sensor 110 is the lowest magnification (5×) and when the revolver switch SWL is depressed, that is, when rotation in the lower-magnification direction or the direction towards the objective of the highest magnification (100×) is selected. Therefore, switching from the objective of the lowest magnification (5×) to the objective of the highest magnification (100×) is not allowed. The revolver switches SWH, SWL are set to the ON state when depressed and are then immediately returned to the OFF state.

When the operator depresses the revolver switch SWH, a rotation instruction is output from the control section 41 to the driver 24 via the output section 22 to move one of the two objectives adjacent to the objective now set on the observation optical axis S which lies on the high-magnification side (in the clockwise direction) onto the observation optical axis S. The driver 24 drives the motor 25 according to the rotation instruction to rotate the mounting body 100 of the revolver 1 in the higher-magnification direction and interrupts the driving of the motor 25 when the corresponding objective is moved to the observation optical axis S. Thus, each time the operator depresses the switch SWH, the objective which is adjacent to the present objective and has a higher magnification than the present objective is sequentially moved to the observation optical axis S.

When the operator depresses the revolver switch SWL, a rotation instruction is output from the control section 41 to the driver 24 via the output section 22 to move one of the two objectives adjacent to the objective now set on the observation optical axis S which lies on the low-magnification side (in the counterclockwise direction) onto the observation optical axis S. The driver 24 drives the motor 25 according to the rotation instruction to rotate the mounting body 100 of the revolver 1 in the lower-magnification direction and interrupts the driving of the motor 25 when the corresponding objective is moved to the observation optical axis S. Thus, each time the operator depresses the switch SWL, the objective which is adjacent to the present objective and has a lower magnification than the present objective is sequentially moved to the observation optical axis S.

Thus, by the above operation by the operator, the objectives can be freely switched from the low-magnification to the high-magnification or from the high-magnification to the low-magnification and can be selectively set on the observation optical axis S. In this case, since rotation of the mounting body 100 in the lower-magnification direction is inhibited when the objective of the lowest magnification (5×) is set on the observation optical axis S as described before, switching to the objective lying in the lower-magnification direction or switching to the objective of the highest magnification (100×) will not be effected even when the revolver switch SWL is depressed. Therefore, the possibility that the objective of the highest magnification (100×) will collide with the sample by erroneous operation of the operator can be suppressed to minimum.

In general, when the objective of 100× is used for observation, the operator effects the focusing operation by use of the objective of 50× and then switches the objective from 50× to 100×. Even in such a case, the deviation in the focusing position caused by a difference in the depth of focus and the parfocal error can be reduced by the above-described action and there occurs no possibility that the objective will collide with the sample.

The feature of the fourth embodiment is controlling to prevent the revolver from rotating in a direction from the side of the lowest magnification (longest working distance) objective (mounting hole) among the objectives neighboring the objective on the observation optical axis towards the side of the highest magnification (shortest working distance) objective (mounting hole), when the objective (mounting hole) of highest magnification (shortest working distance) is moved towards the observation optical axis.

The construction of a revolver control device according to a fifth embodiment of this invention is the same as that shown in FIGS. 2 and 3. Further, the structure of a microscope to which the revolver control device is applied is the same as that shown in FIG. 1.

Figure 10:
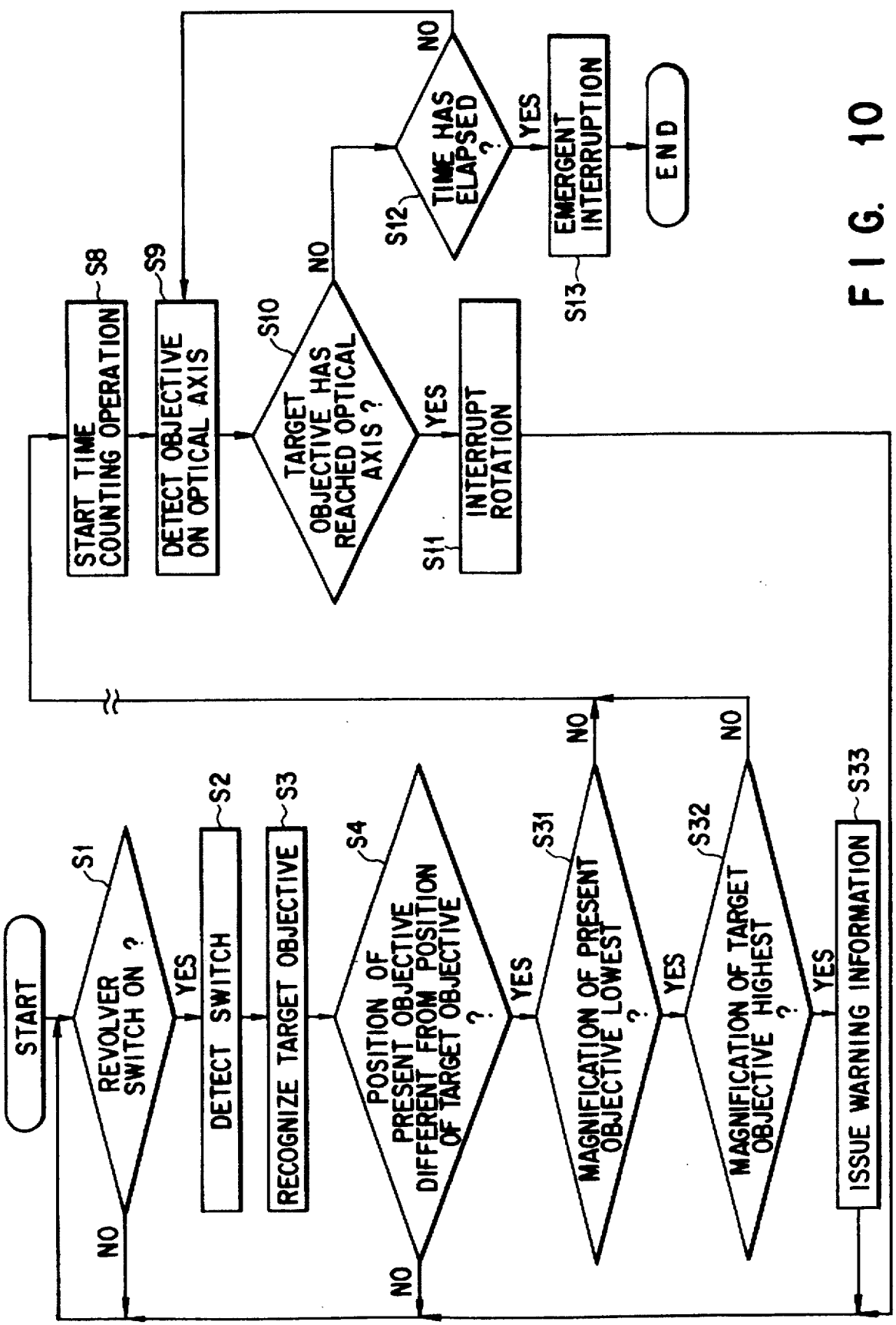
FIG. 10 is a diagram showing the construction of the revolver control device according to the fifth embodiment of this invention.

FIG. 10 is a flowchart for illustrating the operation procedure of the revolver device according to the fifth embodiment. In the flowchart shown in FIG. 10, the same steps as those in FIGS. 7 and 8 are denoted by the same reference numerals. Further, the operations in the steps S1 to S4 in FIG. 10 are the same as those shown in FIGS. 7 and 8.

The comparing/reading section 21 determines in the step S31 whether or not the present objective has the lowest magnification. That is, the comparing/reading section 21 reads out a magnification corresponding to the recognition number of the present objective from a memory 23 and determines whether the readout magnification is the lowest one (5×) of the magnifications of the five objectives 31 to 35 or not.

At this time, if the lowest magnification is determined, the comparing/reading section 21 determines in the step S32 whether the magnification of the target objective is the highest magnification or not. That is, the comparing/reading section 21 reads out a magnification corresponding to the recognition number of the target objective from the memory 23 and determines whether the readout magnification is the highest one (100×) of the magnifications of the five objectives 31 to 35 or not. That is, it is determined in the step S32 whether or not the rotating direction of the mounting body 100 by the driving of the motor 25 is specified to a direction from the lowest magnification towards a lower magnification side, that is, to a direction towards the highest magnification by operation of revolver switches SW1 to SW5.

If it is determined in the step S32 that the magnification of the target objective is the highest magnification, the comparing/reading section 21 drives an alarm circuit (not shown) to issue warning information. As the warning information, a beep or a sound is generated from a buzzer or speaker (not shown) or a warning lamp is turned ON or flashed on and off. After the warning information is issued, the comparing/reading section 21 waits in the step S1 until the operator depresses one of the revolver switches SW1 to SW5 without rotating the mounting body 100. The operation shown in the step S33 can be omitted. That is, if it is determined in the step S31 that the magnification of the present objective is the lowest magnification and it is determined in the step S32 that the magnification of the target objective is the highest magnification, the comparing/reading section 21 does not rotate the mounting body 100 without issuing warning information.

If the comparing/reading section 21 determines in the step S31 that the magnification of the present objective is not the lowest magnification or determines in the step S32 that the magnification of the target objective is not the highest magnification, the operation shown in the steps S5 to S7 in FIG. 7 or the operation shown in the steps S21 to S23, S5 to S7 in FIG. 8 is effected and the operation shown in the steps S8 to S13 is effected.

Thus, according to the fifth embodiment, since warning information is issued, the operator can recognize that the erroneous operation has been effected or the switching from the objective of the lowest magnification (5×) to the objective of the 10 highest magnification (100×) has been specified. Therefore, the operator can take a next measure. This function can be effectively used in the semiconductor checking process in which the blind operation is frequently effected.

The function shown in the fifth embodiment can be applied to the fourth embodiment. If rotation of the mounting body 100 in the lower-magnification direction, that is, in the direction towards the highest magnification (100×) is specified when the objective of the lowest magnification (5×) is set on the observation optical axis S in the fourth embodiment, the rotation is inhibited and the above-described warning information is issued.

This invention is not limited to the above embodiments and can be variously modified without departing from the technical scope thereof.

(Modification)

The five objectives are mounted on the revolver 1 in each of the above embodiments, but the number of objectives is not limited to five and may be set to three or more if the objectives are arranged in a circular form.

In each of the above embodiments, the sensor 110 detects the mounting hole which is set on the observation optical axis S based on the array pattern of the magnetic members arranged on the outer peripheral surface of the mounting body 100 and reads out the magnification of the objective mounted in the detected mounting hole from the memory 23 and recognizes the same. Recognition of the magnification of the objective may be effected by using a recognition circuit (not shown) and reading an inherent recognition number constructed by a code or number attached to the surface of each objective. In this case, the magnification and working distance of the objective corresponding to the recognition number are stored in the memory 23 as in the case shown in FIG. 4. The recognition circuit recognizes the magnification of the objective by reading out a magnification corresponding to the read identification number.

Like the above embodiments, the rotating direction which does not cause the objective (100×) of the shortest working distance to pass the observation optical axis is selected at the time of switching between the objectives, switching to the objective (100×) of the shortest working distance is permitted only from the objective (50×) of the second shortest working distance and the switching from the other objective is inhibited. As a result, even if the deviation in the focusing position caused by the large depth of focus and the parfocal error occurs while observing the sample by use of the objective of low 10 magnification, switching to the objective (100×) of the shortest working distance is not permitted if switching to the objective (50×) of the second shortest working distance is not effected. As a result, switching to the objective (100×) of the shortest working distance can be safely effected after the focusing operation is effected by use of the objective (50×) of the second shortest working distance, thereby making it possible to suppress the possibility that the objective of the shortest working distance will collide with the sample.

In each of the above embodiments, the sensor 110 is used to recognize a plurality of mounting holes, but it is possible to recognize only a specified one of the plurality of mounting holes by use of a recognition circuit (not shown) and mount an objective of the shortest working distance in the specified mounting hole. In this case, the sensor 110 can recognize only the specified mounting hole and recognize that the objective of the shortest working distance is set on the observation optical axis. Specifically, only the magnetic code 121 which is one of the magnetic codes 121 to 125 shown in FIG. 2 is mounted on the mounting body 100. This modification may be applied to each of the above embodiments. In other words, a method of recognizing only one objective (mounting hole) may be applied to each of the above embodiments.

It is also possible to selectively set one of a mode for inhibiting the switching from the objective of the lowest magnification to the objective of the highest magnification shown in the fifth embodiment and a mode for permitting the above switching by depressing a switch (not shown).

In the above embodiments, a case wherein the objectives are arranged in the order of increasing magnification or decreasing magnification is explained, but this is not limitative, and this invention can be applied when the objectives are arranged at random irrespective of the magnification. In this case, an identifiable inherent identifier, for example, identification number is attached to the surface of each objective and a sensor which can read the identifier is provided. Further, the identification numbers, magnifications and working distances WD which are set to correspond to one another as shown in FIG. 4, for example, are stored in the memory 23 of the control circuit 20. With this construction, the magnification of the objective corresponding to the identifier read by the sensor can be read out from the memory 23.

In a case where the objectives are arranged at random irrespective of the magnification, the rotating direction in which the objective of the shortest working distance does not pass the observation optical axis is selected at the time of switching between the objectives like the above embodiments, and switching to the objective of the shortest working distance can be allowed only from the objective of the second shortest working distance and the switching from the other objective is inhibited. As a result, even if the deviation in the focusing position caused by the large depth of focus and the parfocal error occurs while observing the sample by use of the objective of low magnification, switching to the objective of the shortest working distance cannot be permitted if switching to the objective of the second shortest working distance is not effected. As a result, switching to the objective of the shortest working distance can be safely effected after the focusing operation is effected by use of the objective of the second shortest working distance, thereby making it possible to suppress the possibility that the objective of the shortest working distance will collide with the sample.

In the above embodiments, the objective switching order is determined by referring to the magnifications of the objectives, but the objective switching order may be determined by referring to the working distances of the objectives. Generally, the magnification is inversely proportional to the working distance. However, in recent years, objectives having the same magnification but different working distances are formed for special purposes. In this case, it is necessary to set the objective switching order based not on the magnification but on the working distance. In a case where the magnification or working distance can be selectively used as a basis for determining the objective switching order, the rotation control of the revolver can be more precisely effected if the working distance is used.

Additional advantages and modifications will readily occur to those skilled in the art. Therefore, the invention in it's broader aspects is not limited to the specific details, and representative devices shown and described herein. Accordingly, various modifications may be made without departing from the spirit or scope of the general inventive concept as defined by the appended claims and their equivalents.

What is claimed is:

1. A revolver control device comprising:
   a) a rotatable revolver having a plurality of mounting holes in which a plurality of objectives including a specified objective having a highest magnification are respectively mounted, one of said mounting holes being a specified mounting hole corresponding to the specified objective;
   b) a recognition arrangement for recognizing at least one of:
      i) one of said plurality of objectives, and
      ii) one of said plurality of mounting holes which lies on an observation optical axis;
   c) a revolver drive for rotating said revolver to move one of said plurality of objectives onto the observation optical axis; and
   d) a controller for controlling said revolver drive to prevent at least one of:
      i) said specified objective mounted on said revolver, and
      ii) said specified mounting hole from being passed through the observation optical axis by rotation of said revolver, when at least one of the objective and mounting hole recognized by said recognition arrangement is replaced by at least one of said plurality of objectives and mounting holes which is used as one of a target objective and a target mounting hole, respectively.

2. A revolver control device according to claim 1, wherein said revolver drive includes a motor.

3. A revolver control device according to claim 1, further comprising a selector for selecting said target objective from among the plurality of objectives.

4. A revolver control device comprising:
   a) a rotatable revolver having a plurality of mounting holes in which a plurality of objectives including a specified objective having a highest magnification are respectively mounted, one of said mounting holes being a specified mounting hole corresponding to the specified objective;

b) a recognition arrangement for recognizing at least one of:
   i) one of said plurality of objectives, and
   ii) one of said plurality of mounting holes which lies on an observation optical axis;
c) a revolver drive for rotating said revolver to move one of said plurality of objectives onto the observation optical axis; and
d) a controller for controlling said revolver drive to prevent at least one of:
   i) said specified objective mounted on said revolver, and
   ii) said specified mounting hole from being passed through the observation optical axis by rotation of said revolver, when at least one of the objective and mounting hole recognized by said recognition arrangement is replaced by at least one of said plurality of objectives and mounting holes which is used as one of a target objective and a target mounting hole, respectively, said controller controlling said revolver drive to rotate said revolver in a rotating direction which causes a route used for switching from one of said specified objective and said specified mounting hole to a corresponding one of said target objective and said target mounting hole to become shortest when:
   iii) one of the objective and the mounting hole set on the observation optical axis and recognized by said recognition arrangement is said specified objective and said specified mounting hole, respectively, and
   iv) at least one of the objective and mounting hole recognized by said recognition arrangement is replaced by at least one of said plurality of objectives and mounting holes which is used as one of a target objective and a target mounting hole, respectively.

5. A revolver control device according to claim 4, wherein said revolver drive includes a motor.

6. A revolver control device according to claim 4, further comprising a selector for selecting said target objective from among the plurality of objectives.

7. A revolver control device according to claim 4, further comprising a selector for determining whether or not said controller selects a control mode for allowing said revolver drive to rotate said revolver in a rotating direction which causes the route used for switching from one of said specified objective and said specified mounting hole to a corresponding one of said target objective and said target mounting hole to become shortest.

8. A revolver control device comprising:
a) a rotatable revolver having a plurality of mounting holes in which a plurality of objectives are mounted, the mounting holes including a first specified mounting hole corresponding to a first specified objective having a highest magnification and a second specified mounting hole corresponding to a second specified objective having a lowest magnification;
b) a recognition arrangement for recognizing at least one of:
   i) one of said plurality of objectives, and
   ii) one of said plurality of mounting holes which are arranged on an observation optical axis;
c) a revolver drive for rotating said revolver to move one of:
   i) one of said plurality of objectives, and
   ii) one of said mounting holes which is adjacent to one of the objectives and mounting holes set on the observation optical axis onto the observation optical axis; and
d) a controller for controlling said revolver drive to prevent rotation of said revolver in a preset direction from one of said second specified objective and said second specified mounting hole to a corresponding one of said first specified objective and said first specified mounting hole, said preset direction being defined by a shortest distance therebetween, when at least one of said objective and mounting hole recognized by said recognition arrangement is at least one of said second specified objective mounted on said revolver and said second specified mounting hole.

9. A revolver control device according to claim 8, wherein said revolver drive includes a motor.

10. A revolver control device according to claim 8, further comprising a selector for selecting the rotating direction of said revolver.

11. A revolver control device according to claim 10, further comprising an alarm for giving a warning when said preset direction is selected as the rotating direction of said revolver by said selector, when at least one of the objective and mounting hole recognized by said recognition arrangement is at least one of said second specified objective mounted on said revolver and said second specified mounting hole.

* * * * *

UNITED STATES PATENT AND TRADEMARK OFFICE
CERTIFICATE OF CORRECTION

PATENT NO. : 5,737,134
DATED      : April 7, 1998
INVENTOR(S) : WATANABE et al.

It is certified that error appears in the above-identified patent and that said Letters Patent is hereby corrected as shown below:

On the Title page:

Item [30] "Foreign Application Priority Data", line 2 delete, "Jun. 12, 1995   [JP]   Japan .......7-170260"

Signed and Sealed this

Tenth Day of August, 1999

Attest:

Q. TODD DICKINSON

*Attesting Officer*      *Acting Commissioner of Patents and Trademarks*